(No Model.)
M. L. J. GIRDANY.
MACHINE FOR MILLING OR FORMING SETTINGS.
No. 495,325. Patented Apr. 11, 1893.
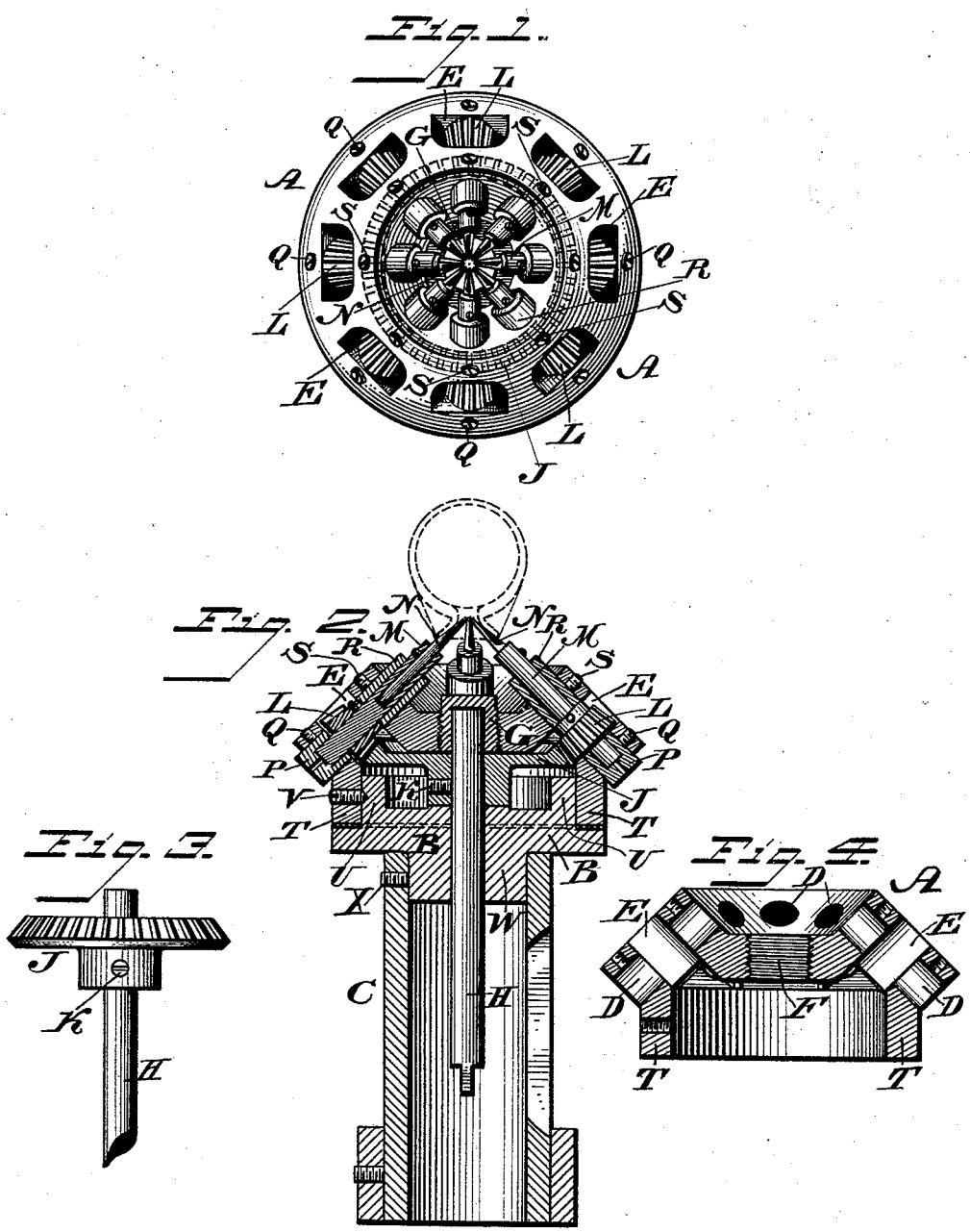
WITNESSES:
L. Douville,
P. Th. Chagler
INVENTOR,
Morris L. J. Girdany
BY John A. Wiedersheim,
ATTORNEY.

UNITED STATES PATENT OFFICE.

MORRIS L. J. GIRDANY, OF PHILADELPHIA, PENNSYLVANIA.

MACHINE FOR MILLING OR FORMING SETTINGS.

SPECIFICATION forming part of Letters Patent No. 495,325, dated April 11, 1893.

Application filed May 19, 1892. Serial No. 433,498. (No model.)

*To all whom it may concern:*

Be it known that I, MORRIS L. J. GIRDANY, a citizen of the United States, residing in the city and county of Philadelphia, State of Pennsylvania, have invented a new and useful Improvement in Machines for Milling or Forming Settings, Recesses, &c., which improvement is fully set forth in the following specification and accompanying drawings.

My invention consists of a machine for milling or cutting settings, recesses, &c., in jewelry and other articles and metal generally. To this end I employ a series of converging cutters which are engaged by gearing whose bearings are on a head of novel construction as will be hereinafter set forth.

Figure 1 represents a top or plan view of a cutter embodying my invention. Fig. 2 represents a longitudinal section thereof. Fig. 3 represents a side elevation of a detached portion. Fig. 4 represents a section of a detached portion. Fig. 5 illustrates the work accomplished.

Similar letters of reference indicate corresponding parts in the several figures.

Referring to the drawings:—A designates a head, which is connected with a block B, which latter is attached to the stock C, by which the machine may be supported.

The head A consists of a circular piece of metal, partly cylindrical and partly conical, the conical portion having rows of obliquely-arranged openings D and E therein, the openings E bisecting the openings D. The lines of direction of said openings D converge outside of the said head A. In the center of the head is a threaded opening F, to which is fitted the screw cap G, which forms the bearings for the adjacent end of the driving shaft H, which latter passes freely through the stock C and block B, into said cap. Within the head A, is a bevel gear wheel J, whose hub is placed on and secured to said shaft H, by means of the screw K or other suitable means, whereby rotation may be imparted to said wheel J. In the openings E of the head are bevel pinions L, which mesh with the wheel J, and which are connected with the shafts M of the cutters N of the machine, said shafts occupying the openings D of the head. In the ends of the openings D opposite to the cutters, are bushings P, which are secured to the head by means of screws Q or other means, said bushings forming the end bearings of the shafts M. In the opposite ends of the openings D are bushings R, which form the bearings for the adjacent portions of said shafts, said bushings being connected with the contiguous part of the head A, by means of screws S or other suitable means. The head A has at the end opposite to the cutters a flange T, which embraces a flange U on the block B, and is secured thereto by means of a screw V or other suitable means. The block B has a hub W which enters the stock C and is secured thereto by means of a screw X or other suitable means. The cutters N are conical or tapering, and having cutting edges on their sides, it being noticed that owing to the oblique direction of the openings D, said cutters converge, without however, contacting at their points.

The operation is as follows:—Power is applied to the shaft H, whereby the wheel J is rotated and motion communicated to the pinions L, and consequently to the shafts M and cutters N. The article to be formed into settings or cut into a circular row of slots is then presented to the cutters, or the machine advanced against said article, whereby the cutters form said settings or slots, they gradually widening and deepening the same as the work progresses, a form of product being shown in Fig. 5. It will be seen that the action of the machine is uniform, easy and effective, that the bearings of the shafts are firm and steady, and that the machine is of strong and durable construction. It will also be seen that when the screws S and Q, and those of the pinions L are loosened, the cutters may be easily displaced for purposes of sharpening, repairs and adjustment, and all of the other parts may be readily separated and afterward restored and connected in convenient manner. As the cutters are tapering in form, the slots produced widen toward the base, leaving the points in the article thin or reduced for bending purposes.

Having thus described my invention, what I claim as new, and desire to secure by Letters Patent, is—

1. A machine for the purpose named having a stock, a block secured thereto, a single hollow head secured on said block, a central shaft having a bearing in said block, shafts having bearings in said head and arranged obliquely to said central shaft, and meshing wheels on said central and oblique shafts within said head, said parts being combined substantially as described.

2. In a machine substantially as described, the head A having openings D, E therein, the gear wheel J within said head, the block B with which said head is connected, the shaft H passing through said block and connected with said head, the pinions L in the openings E, the shafts M in the openings D, and the converging cutters N on said shafts, the parts named being combined as stated.

3. In a machine for the purpose named, the combination of a block, a single head secured thereto and having rows of obliquely arranged openings therein, a central shaft with a bevel gear wheel thereon mounted in said block and within said head, and adjustable shafts mounted in one row of said oblique openings and provided with gear wheels meshing with said first mentioned bevel gear wheel, substantially as described.

4. In a machine for the purpose named, a head having the rows D and E of oblique openings, and the central threaded opening F, the screw cap G in said latter opening, a shaft having a bearing in said cap and provided with a bevel gear wheel, and bushings in said openings D, shafts having bearings in said bushings, bevel gear wheels mounted on said latter mentioned shaft, and having gearing meshing with said bevel gearing, and cutters on said shafts, said parts being combined substantially as described.

5. A head with openings D and E, cutter shafts M in the openings D, and pinions on said shafts in the openings E, the gear wheel J within said head meshing with said pinions, the driving shaft H, secured in said gear wheel, and the caps G in said head in which the end of the shaft H is mounted, said parts being combined substantially as described.

6. A head with openings D and E, the cutter shafts M and pinions L in said openings, the gear wheel J in said head meshing with said pinions, the block B supporting said head, the shaft H passing through said block and secured to said wheel, and having a bearing in said head, and the stock C carrying said block, the parts named being combined substantially as described.

7. A machine for the purpose named, consisting of a single head partly cylindrical and partly conical in form, and having the rows of obliquely arranged openings D and E in said conical part, and a screw-threaded opening in its center, a block to which said head is connected, a stock secured to said block, a rotatable shaft mounted in said head and block, a bevel wheel on said shaft, wheels in one row of said oblique openings mounted on shafts in the other row, and gearing with said bevel gear wheel, and boring or milling tools on said shafts, said parts being combined substantially as described.

MORRIS L. J. GIRDANY.

Witnesses:
JOHN A. WIEDERSHEIM,
A. P. JENNINGS.